(No Model.) 2 Sheets—Sheet 1.
H. LEMP.
METHOD OF AND APPARATUS FOR CONSTRUCTING ELECTRIC LIGHT OR OTHER LINES.
No. 462,263. Patented Nov. 3, 1891.
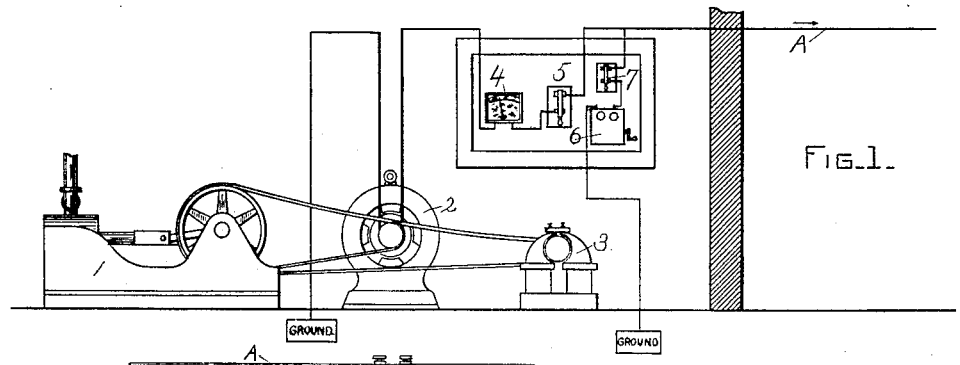
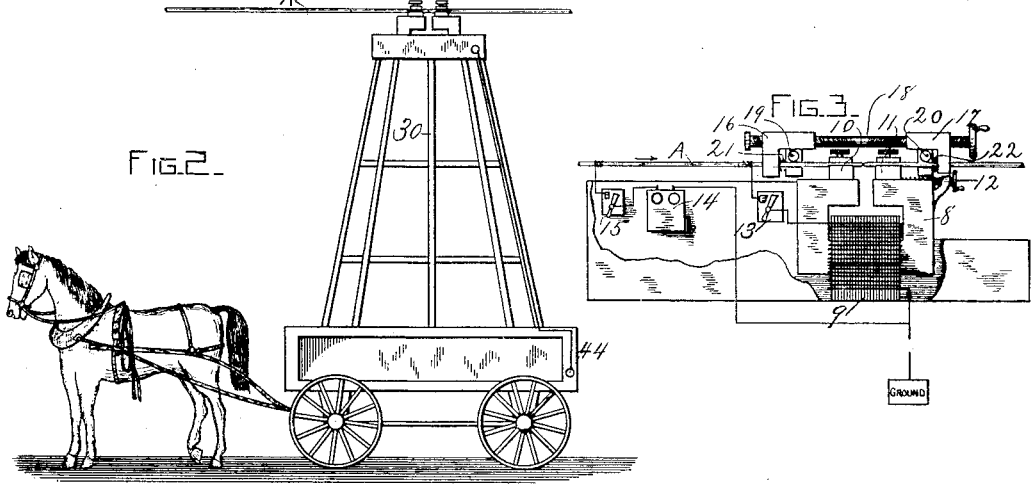
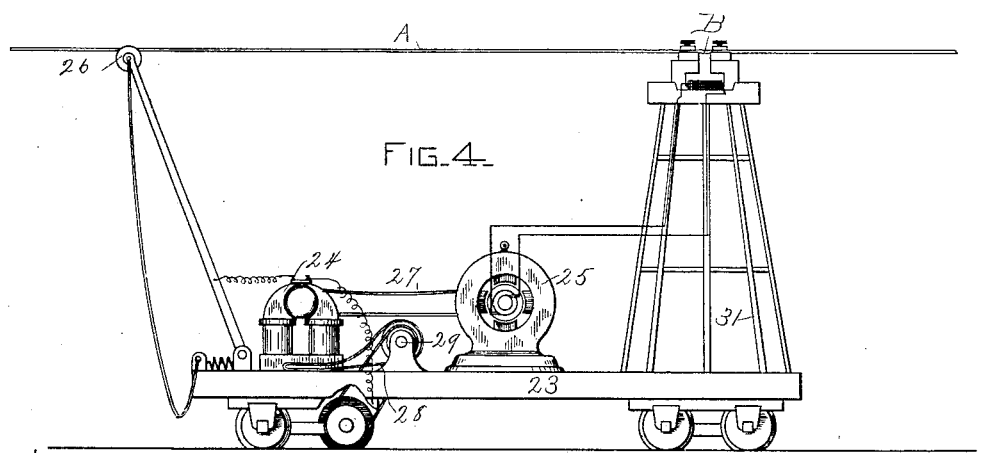
WITNESSES
Wm. D. Capel
T. F. Courey
INVENTOR
Hermann Lemp
By H. C. Townsend
Atty.

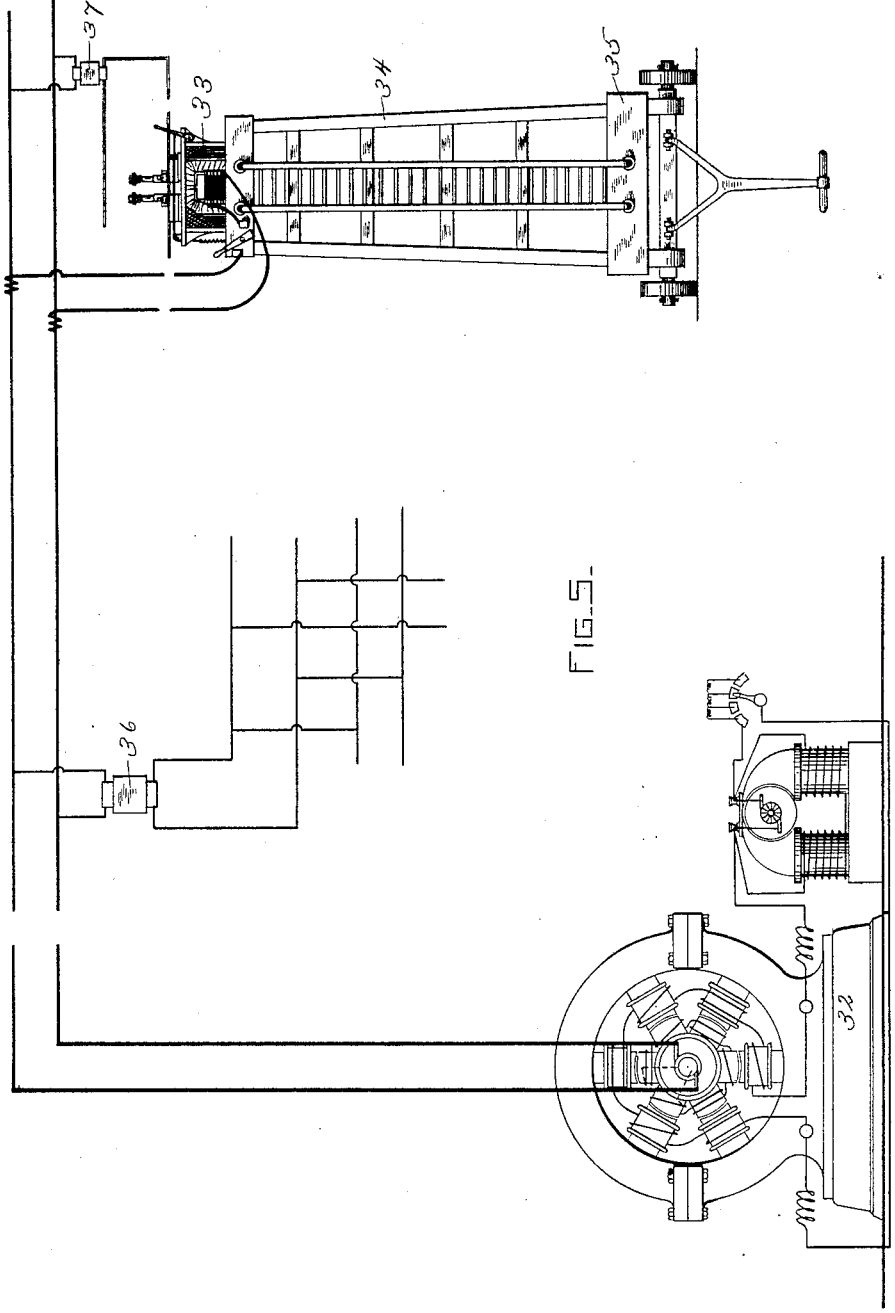

# UNITED STATES PATENT OFFICE.

HERMANN LEMP, OF LYNN, MASSACHUSETTS, ASSIGNOR TO THE THOMSON ELECTRIC WELDING COMPANY, OF MAINE.

METHOD OF AND APPARATUS FOR CONSTRUCTING ELECTRIC LIGHT OR OTHER LINES.

SPECIFICATION forming part of Letters Patent No. 462,263, dated November 3, 1891.

Application filed March 30, 1891. Serial No. 386,911. (No model.)

*To all whom it may concern:*

Be it known that I, HERMANN LEMP, a citizen of the United States, and a resident of Lynn, in the county of Essex and State of Massachusetts, have invented certain new and useful Methods of Constructing Electric Light, Power, Telegraph, and other Lines, of which the following is a specification.

My invention relates to the formation or building up of structures of a material that is a conductor of electricity; and it consists of a novel method of construction wherein electricity is used as the heating agent in a metal-working operation by which extensions of the structure may be united to portions previously completed.

The invention is especially applicable to the construction of lines of metal—such, for instance, as electric light, power, telegraph, telephone, and other conductors—and affords a means whereby a good joint or splice may be made between sections of the line.

The electric metal-working operation which is employed as a part of my invention is, by preference, electric welding, as it affords a means whereby a line practically integral throughout its whole extent may be made, with the conductivity and strength at the joint practically the same as at other parts. At the same time I do not limit myself to welding, as the joints might be formed by brazing, riveting, or by other ways of constructing joints between pieces of metal, the electricity being used as the heating agent in a way now well understood.

My invention consists in forming the joints by means of a portable electric metal-working machine carried to the joint and supplied with electric energy taken from conductors in the vicinity of the work being done, the machine being temporarily connected to said conductors for that purpose.

My invention consists, further, in a novel method of forming or building up a structure from a material that is a conductor of electricity, consisting in taking off from the completed portion of the structure electric energy supplied from any desired source, converting said energy into electricity suitable for electric metal-working operations, and using said converted energy as the heating agent in forming a metal joint between the completed portion of the structure and an extension or addition thereto.

My invention consists, further, in a novel method of constructing lines of a material that is a conductor of electricity by taking off from the completed portion of the line electric energy supplied from any desired source, converting said energy into electricity suitable for an electric-welding operation, and using the converted energy for uniting an extension of the line to the completed portion by the electric-welding process.

My invention consists, also, in the novel method of constructing electric light, power, telephone, telegraph, or other lines, consisting in transporting an electric metal-working apparatus suitable for use in forming joints or splices between sections of metal conductor to the point where an extension of the line is to be united therewith, supplying the completed portion of the line with electric energy from any desired source, converting the energy at the point where the joint is to be formed into electric energy of larger current density, and then using such converted agency as the heating agent in the metal-working operation by which the two portions of the line are united.

My invention consists, also, in certain improved processes and combinations of apparatus employed in carrying out my invention, as will be hereinafter described, and more particularly specified in the claims.

My invention is of especial utility in the construction of trolley-wires for electric railways, since in such a case the use of the ordinary telegraph-wire splice is impracticable and is next to impossible to make in hard-drawn copper wire. By the operation of electric welding, also, considerable material may be saved, as no more than one-half inch of the length of the wire is necessarily employed in forming the joint when it is made by the electric-welding process.

In the accompanying drawings, Figure 1 illustrates an arrangement of apparatus that may be employed at the point where the line is supplied with the electric energy. Fig. 2 is a part of the apparatus that may be employed at the joint. Fig. 3 shows a portion of an electric-welding machine that may be used at the joint. Fig. 4 illustrates a construction of apparatus designed for use in constructing the trolley or other line of an electric railway. Fig. 5 is a diagram illustrating my invention as used in constructing the secondary lines of a transformer system.

In Fig. 1 the apparatus shown is supposed to be located at a power-station or general distributing-point, from which leads the line A to be constructed.

2 is any dynamo-electric machine, preferably an alternating dynamo, driven by a motor, such as a steam-engine 1 or any other power, and 3 any other dynamo-machine at the power-station, not necessarily used in practicing my invention.

4 is an ammeter in the circuit from the machine 2 to the line A, and 5 the usual switch for opening the circuit. In addition I employ by preference a second switch 7 and a magneto-signaling machine 6, placed in a branch or ground connection from the line A.

When welding is employed to form the joints, I may use a welder of the type indicated in Fig. 3, wherein 8 shows the usual low-resistance secondary, consisting of a bar of metal, to which is applied the usual core and primary 9, that, being traversed by alternating currents, sets up the currents of large volume in the secondary proper for heating the metal to be welded. The secondary carries the two usual relatively-movable clamps 10 11, one only of which is herein shown as made movable by the operation of a screw 12 for the purpose of applying the welding pressure when the metal is softened sufficiently by the current.

On account of the great tensional strain to which suspended lines of conductor are subjected, I prefer to use in connection with the welding-machine an auxiliary mechanical device to take up the strain, and which is attached outside of the clamps of the welder. The device herein shown consists of two clamps or grips 19 20, similar to those of a lineman's "come-along," which are guided on the under surface of angle-blocks or supports 16 17, connected by a right and left hand screw 18. The grips or clutches 19 20 are backed by stiff springs 21 22. The turning of the screw 18 by a suitable handle will cause the angle-blocks or supports to draw together, carrying with them the two clutches, which are held up to their work by the stiff springs, the latter preventing the wire from drawing back through the clamps of the welding-machine. In welding by this apparatus the sections of wire to be joined are abutted, the mechanical holding device is attached, the screw 18 turned to compress the springs 21 22, and the wires between the clutches clamped in the holders of the welding-machine.

The welding apparatus is made portable and preferably mounted upon a frame or stage, such as indicated in Fig. 2 at 30, carried by a wagon, by which the whole welding-machine may be conveniently transported along the line in the course of construction.

For convenience I employ with the welding apparatus on the portable frame 30 a magneto-bell 14 and a switch 15, which may be tapped to the wire A temporarily by any desired means. There is also, preferably, a switch 13 in the circuit of the primary wire for the transformer. One terminal of both primary and magneto connects to a binding-post 44 on the wagon, from which temporary connection may be conveniently made to the return circuit, consisting, ordinarily, of a ground-circuit. Such temporary connection may be formed on the nearest hydrant, gas-pipe, or other article which will furnish a good ground.

In constructing the line A with the apparatus described the procedure is as follows: At all times, except when special signal is given, station-switch 5 is preferably open and the switch 7 closed. The welding apparatus having been transported along the line to the point where the additional section or extension thereof is to be joined to it, the welder is connected to the completed portion of the line, which is supplied with the energy from the source 2, such connection being made by temporarily connecting the primary of the welder in any desired way. The extension or addition to the wire A and the end of the completed portion of the same are fastened in the welding-machine, as previously described. The switch 13 is opened and the switch 15 is closed. The operator on the wagon then rings his magneto, giving a signal to the station, which signal is answered, and both magneto-switches 15 and 7 are then opened. The operator at the station then closes switch 5 and the operator at the welder uses switch 13 to close the circuit of the primary of his transformer, thereby abstracting energy from the completed portion of the line A and causing it to be converted into electric energy of suitable volume for heating the metal of the conductor A to the welding temperature at the point where the joint is to be formed. The ammeter 4 indicates to the station-man that current is being used. The weld is then made in the ordinary way, after which the operator opens the switch 13, thereby causing the ammeter 4 or other indicating device to show to the station-man that the operation has been completed. The station-man thereupon opens switch 5, closes switch 7, and is ready for another signal.

The above is but one way of using the apparatus described. The magnetos and signaling devices are not necessarily employed, but are an element of safety. The wire A might be permanently connected to the dynamo 2 and the switch 13 at the welder used to interrupt the flow of current through the primary of the welder at pleasure. After the completion of the weld the apparatus is carried along the line to the new end and a new extension or addition welded onto the already completed portion thereof.

I have described the operation as one in which electric welding is employed; but the use of the heating-current abstracted from the line in other ways to form a joint or splice would be within my broad invention. In performing electric-welding operations upon the metal of the line in course of construction by means of energy taken therefrom it is necessary, however, to employ a transformer adapted to convert the current taken from the completed portion of the line into current of sufficient volume to heat the piece of metal of the cross-section of said line to the welding temperature. In some cases it might not be necessary to convert the electric energy of the line; but this would depend upon the nature of the metal-working operation used in forming the splice or joint. Ordinarily it will be found necessary to convert the energy. My invention consists especially in a method or process in which such conversion is performed.

In Fig. 4 I have illustrated an apparatus especially adapted for use in constructing a trolley-line or other electric conductor on an electric railway. Here I have shown the invention as applied to a circuit where the return is made by way of the rails; but it is obvious that the invention would be just as well applicable to the case where a return circuit is made by way of another conductor previously made or constructed along with the line A.

23 is any truck or platform mounted upon a suitable wheel-base movable along the line of construction of the wire or trolley-conductor A and carrying any suitable means for converting the energy taken from said line A into the energy required in the welding operation.

In some cases it may be desirable to use a converter adapted to convert a continuous current into a current of larger volume used in the welding operation. This is especially the case in the construction of trolley-wires for electric railways. It would obviously be, however, within my invention to employ an alternating current upon the line A during its construction. The converter illustrated in Fig. 4 is one adapted to convert a continuous current taken from the line A, and for such purpose I employ any usual or desired combination of electric motor and generator, the motor being driven by the energy taken from the line A, and the generator which supplies the welder or other metal-working device being driven from the said electric motor.

The connection of the generator and motor mechanically might be by means of a belt or otherwise. For the sake of illustration I have shown a motor 24 supplied with energy through the trolley 26 and connected by a belt 27 to an alternating dynamo 25. This dynamo might supply directly the metal-working current, but by preference I use its alternating currents through a second conversion by means of a transformer or otherwise for the purpose of getting the desired heating-current. The motor 24 may be the motor used for propelling the movable support, consisting of the platform 23, mounted on suitable car-trucks, for which purpose it may be provided with a clutch or other means for temporarily connecting it either to a car-axle or to the generator 25. Such means are here typified by the belts 27 and 28, which may be slipped off the pulley on the shaft of the motor 24 at pleasure. The belt 28 is used to run a counter-shaft 29, that in turn is belted to a wheel on the car-axle. When this arrangement of apparatus is employed, the welding apparatus may be moved along the constructed portion of the line by means of the energy taken therefrom to the point where the addition or extension of said line is to be welded thereto, and then the energy taken from the line may be used for welding on such addition or extension. When two wires or conductors are run in the same direction or near each other, the return connection may be, and is preferably, made by one of such wires, thus forming a metallic circuit which is preferable to a ground return such as hereinbefore illustrated.

I have so far described that part of my invention which consists in taking energy from the structure which is being built, which is done when there are no other circuits in the vicinity; but if there already exists an alternating-current circuit or a continuous-current circuit in the neighborhood of the points where the joints are to be made current may be taken from such circuit directly to supply the welder or like machine. In a building the dynamo to be subsequently used therein may be put in place and the wires or electric lines constructed in accordance with my invention by the energy taken therefrom.

Fig. 5 illustrates a way of constructing the secondary lines of transformers in a building or at other places. The drawing shows at 32 an ordinary alternating-current dynamo feeding a primary circuit for transformers 36 and 37. The dynamo may be in the same building or in another building. The welding apparatus 33 is mounted on a staging 34 and truck 35, so that it may be conveniently carried from place to place. The primary thereof is shown as temporarily connected to the primary circuit supplied from the dynamo 32, and its secondary is shown as supplying the heating-current for welding the wires of the secondary for a transformer 37. This could be done, and preferably is done, before such secondary wire is connected to its transformer; but in some cases, especially where the joints should be located at a considerable distance from the primary circuit, the welding-current may be taken from the secondary circuit itself in which the weld is to be formed, the current being, however, transformed, as already described, for the purpose of making the welded joint.

What I claim as my invention is—

1. The herein-described method of building up structures of material that is a conductor of electricity, consisting in abstracting electric energy from the structure supplied thereto from any suitable point and employing the electric energy so taken as the heating-agent for uniting or joining an addition or extension of said structure to the portion previously completed.

2. The herein-described improvement in building up metal structures of a material that is a conductor of electricity, consisting in taking electric energy from the completed portion of the structure at or near the point where an addition or extension thereof is to be made, converting said energy into energy suitable for use in an electric metal-working operation, and using such converted energy to heat the material and form a metal joint or splice between the addition or extension and the completed portion.

3. The herein-described method of constructing electric lines or conductors for electric light, power, or other purposes, consisting in taking energy from a completed portion of the line, converting the electricity into energy of larger current density, and using the converted energy in an electric-welding operation for welding an extension or addition of the line to the completed portion thereof.

4. The herein-described method of constructing electric light, telegraph, or power lines, consisting in forming a joint between a completed portion of the line and an extension thereof by an electric-welding operation in which the heating-current consists of energy abstracted and converted from the completed portion of the line, moving the welding-machine along the conductor to the next joint to be formed, and there repeating the operation until the desired length of line has been made.

5. The herein-described method of constructing electric light, power, telephone, telegraph, or other lines, consisting in welding an addition or extension to the completed portion of the line by an electric-welding process in which the welding-current is taken from a conductor in the vicinity of the work being done, moving the portable electric welding-machine forward along the completed portion to the end thereof, and then welding on another addition or extension in the same manner and repeating the operation until the desired length of line is obtained.

6. The combination, in an apparatus for welding electric light, power, or other lines, of an electric-welding apparatus and a pair of exterior mechanical clamps mounted upon supports connected by a right and left hand screw.

7. The combination, in an apparatus for welding electric light, power, or other lines, of an electric-welding apparatus and a pair of exterior spring-actuated clamps or holders for holding the ends of the line to be joined and relieving the welding-clamps of tensional strain.

8. The combination, in an apparatus for welding electric light, power, or other lines, of an electric-welding apparatus and an exterior mechanical clamp or holder mounted and guided upon a suitable support and provided with an actuating-spring for taking the strain of the line from the welding-clamp, as and for the purpose described.

9. The combination, in an electric-welding apparatus for welding electric light, power, or other suspended wires or conductors, of a pair of auxiliary mechanical clamps adapted to be attached to the ends of the wire outside of the clamps of the welder and means for forcing said auxiliary mechanical clamps toward one another.

10. The herein-described method of constructing a power line or conductor for an electric railway, consisting in taking continuous current from the completed portion of said line, converting the same into alternating electric currents of proper volume to be used in the welding operation, welding on an extension or addition of said line to the completed portion, and then moving the welding apparatus forward to the end of such addition or extension and there repeating the operation.

11. The herein-described method of constructing trolley-lines for electric railways, consisting in taking electric energy from the completed portion of the line, forming the joint or splice between the completed portion and an addition or extension thereto by an electric metal-working operation, and employing as the heating-current in such operation the converted energy taken from the completed portion of the line.

12. In an apparatus for constructing power-lines for electric railways, the combination, substantially as described, of an electric-welding or metal-working apparatus, an electric generator, and an electric motor all mounted on a car, and means for connecting the electric motor with the completed portion of the power-line, as and for the purpose described.

13. In an apparatus for constructing power-lines for electric railways, the combination, substantially as described, of an electric metal-working apparatus and generator therefor mounted on a car, a propelling electric motor for said car driven from said power-line, and means for connecting said motor at will to the generator of the welding apparatus and at the same time disconnecting it from the propelling devices.

14. In an apparatus for constructing electric light, power, or other lines, the combination, substantially as described, of a continuous-current motor, means for connecting the same with a completed portion of the line, an alternating-current generator driven thereby, and an electric-welding transformer mounted on a staging in position to take the suspended conductor.

15. In an apparatus for constructing electric power, telegraph, or other lines, the combination, substantially as described, with a generator connected to a completed portion of the line and a branch therefrom containing a signaling apparatus, of a portable electric metal-working apparatus movable along the line of converted conductor, a signaling apparatus movable therewith, and electric switches whereby the metal-working apparatus or the signaling apparatus movable therewith may be connected into a branch or ground connection at pleasure.

16. The herein-described method of constructing metal lines by welding on successive additions or extensions, consisting in supplying electric energy to the completed portions of the line, taking off the energy at or near the end of the completed portion, converting it into electric energy of larger current density, welding in the addition or extension by an electric-welding operation in which the energy so converted is used as the heating agent, moving the welding apparatus forward to the farther end of the welded on addition, and there repeating the operation.

Signed at Lynn, in the county of Essex and State of Massachusetts, this 14th day of March, A. D. 1891.

HERMANN LEMP.

Witnesses:
JOHN W. GIBBONEY,
WARREN B. LEWIS.